United States Patent
Kline et al.

[11] 3,922,838
[45] Dec. 2, 1975

[54] MACHINE FOR FORMING A COMPACT STACK OF CROP MATERIAL

[75] Inventors: Charles M. Kline, Reinholds; Edward H. Priepke, Stevens; Thomas W. Waldrop, New Holland; Raymond E. Fisher, Lancaster; James G. Greiner, Leola; Horace G. McCarty, Lancaster, all of Pa.

[73] Assignee: Sperry Rand Corporation, New Holland, Pa.

[22] Filed: Apr. 5, 1974

[21] Appl. No.: 458,266

[52] U.S. Cl. .................................. 56/344; 214/518
[51] Int. Cl.² ........................................ A01D 87/10
[58] Field of Search ............... 56/1, 345, 344, 346; 214/518–522; 100/210

[56] References Cited
UNITED STATES PATENTS
3,840,134  10/1974  Luscombe ........................ 214/518
FOREIGN PATENTS OR APPLICATIONS
1,101,170  8/1961  Germany ............................ 56/346
1,582,324  9/1970  Germany ............................ 56/344

Primary Examiner—Russell R. Kinsey
Attorney, Agent, or Firm—John R. Flanagan; Frank A. Seemar; Joseph A. Brown

[57] ABSTRACT

A compact stack forming machine, having a mobile chassis adapted to move across a field, includes an upright delivery tube mounted on the chassis with a pickup mounted at its lower end adjacent the field for picking up crop material from the field and propelling the crop material through the tube and into a stack forming chamber, being mounted on the chassis rearwardly of the tube and pickup, through a first open end toward an opposite second end of the chamber with sufficient velocity to substantially reach the second end thereof, a carriage frame extending across the chamber and moveable between the chamber ends with a baffle member being moveably mounted thereon for at least partially deflecting the propelling crop material from time to time during movement of the carriage frame to distribute the crop material within the chamber between the ends thereof and thereby progressively form a stack of the crop material in the chamber, and a packing roll extending across the chamber below the baffle member and moveable between the chamber ends to compact the distributed crop material as the stack is progressively formed in the chamber.

20 Claims, 13 Drawing Figures

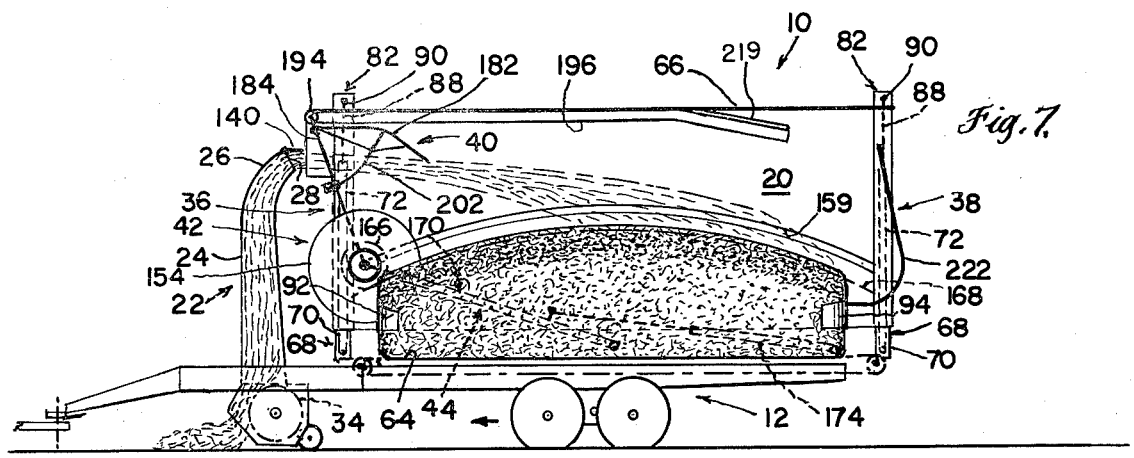
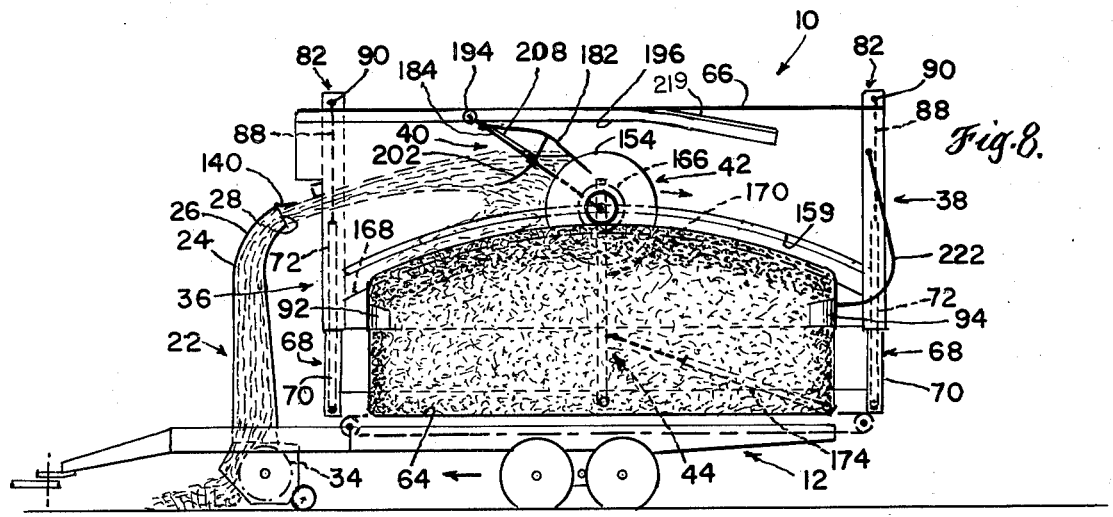
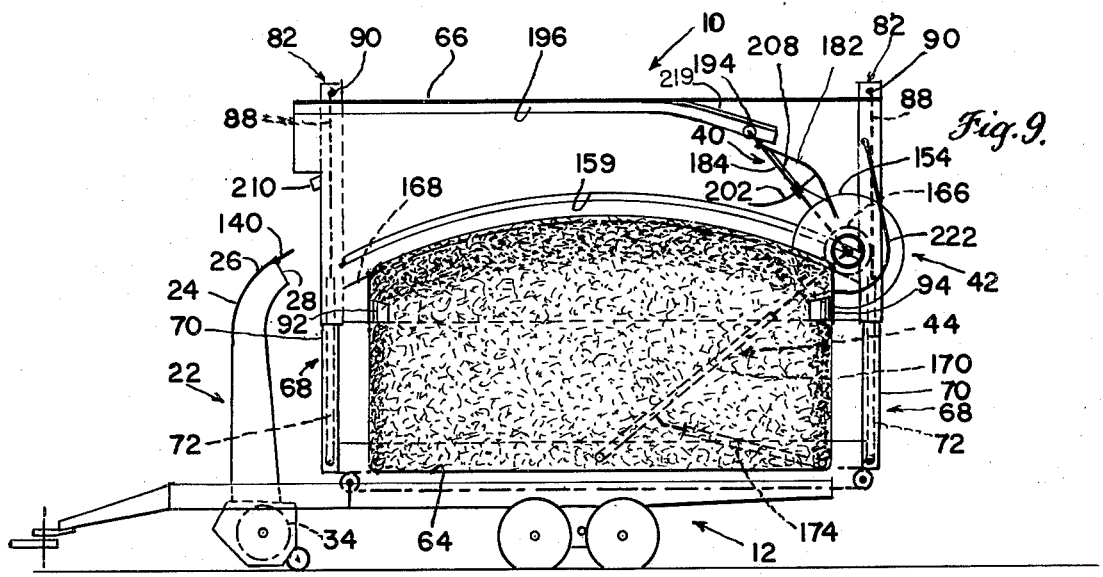

MACHINE FOR FORMING A COMPACT STACK OF CROP MATERIAL

CROSS REFERENCES TO RELATED APPLICATIONS

Reference is hereby made to the following co-pending U.S. applications dealing with related subject matter and assigned to the assignee of the present invention:
1. "Machine for Forming a Compact Stack of Crop Material" by Gene R. Butler et al, U.S. Ser. No. 458,260, now U.S. Pat. 3,884,021, filed Apr. 5, 1974.
2. "Machine for Forming a Compact Stack of Crop Material" by Gene R. Butler et al, U.S. Ser. No. 458,261, filed Apr. 5, 1974.
3. "Machine for Forming a Compact Stack of Crop Material" by Lee D. Butler et al, U.S. Ser. No. 458,265, filed Apr. 5, 1974.
4. "Machine for Forming a Compact Stack of Crop Material" by James R. Koop et al, U.S. Ser. No. 458,267, now U.S. Pat. 3,881,306, filed Apr. 5, 1974.
5. "Machine for Forming a Compact Stack of Crop Material" by David L. Darnall et al, U.S. Ser. No. 458,270, filed Apr. 5, 1974.

BACKGROUND OF THE INVENTION

1. Field of the Invention

The present invention relates generally to the art of harvesting loose crop material and, more particularly, is concerned with a method and machine for continuously picking up crop material such as loose hay or the like and progressively forming the crop material into a large, compact stack.

2. Description of the Prior Art

For many years now, the predominate method of harvesting loose crop material such as hay or the like in the United States and many other countries has been to continuously pick up the previously cut and windrowed hay and form it into small wire- or twine-tied rectangular bales with an automatic baler, the bales normally ranging in weight from approximately 50 to 125 pounds.

Over the years, the automatic baler method of harvesting hay has usually necessitated the assistance of a crew of persons, in addition to the baler operator, in handling and storing the bales. In recent years, the availability of hay harvesting labor has become more scarce and labor costs have steadily risen. However, the impact of these unfavorable conditions on the popularity of the automatic baler method has been greatly minimized during the past decade by the introduction and growing commercial acceptance of the automatic bale wagon, which was originally illustrated and described in U.S. Pat. No. 2,848,127 and more recently, for example, in U.S. Pat. No. 3,502,230. In many parts of the United States, the automatic baler method has been largely integrated into a completely automatic hay harvesting and handling system by the aforementioned bale wagon which is believed to have assured the continued, widespread viability and soundness of the automatic baler method of harvesting hay.

However, even in view of the widespread acceptance of the automatic baler method and the growing acceptance of the automatic bale wagon, other alternative methods of harvesting hay have periodically been proposed and introduced over the years.

One alternate method recently introduced utilizes a stack forming machine which picks up loose windrowed hay or the like and forms it into a large, compact stack, the stack normally ranging in weight from approximately 3 to 6 tons. This compact stack forming method of harvesting loose hay has been realizing considerable commercial acceptance in the central and northern plain states region of the United States. In this region of the country, because of a variety of factors, some of which are climatic and terrain conditions and traditional ranching and stock feeding practices, crop material such as hay or the like has been traditionally harvested by gathering and building the hay in loose form into large stacks.

One type of commercial compact stack forming machine is illustrated and described in U.S. Pat. Nos. 3,556,327, 3,691,741, 3,732,672 and 3,733,798 and has a stack forming body into which loose crop material is blown and built into a stack with the body vertically reciprocably mounting a compression roof for periodically compacting the stack.

Another type of commercial compact stack forming machine is illustrated and described in U.S. Pat. No. 3,720,052 and has a rotating stack forming platform onto which loose crop material is conveyed and a packing drum which rolls against the stack as the platform and stack rotate to compact the stack as it is being formed on the platform.

Various other proposed types of compact stack forming machines are illustrated and described in the prior art. For example, U.S. Pat. Nos. 3,691,742, 3,728,849, 3,744,228, and 3,768,679 disclose machines which also have stack forming bodies with various types of vertically movable compression devices for compacting the stack being formed in the body. In addition, U.S. Pat. No. 3,751,892 discloses a machine which also has a stack forming body and utilizes a horizontally movable compression wall member for compacting the stack being formed in the body. Still further, German Pat. No. 1,101,170 and Argentine Pat. No. 167,422 disclose machines which utilize packing rolls for compacting a stack of crop material being formed on a platform of the machine.

SUMMARY OF THE INVENTION

The present invention broadly comprises, in a method of forming a compact stack of crop material such as hay or the like in a mobile chamber adapted to move across a field, the steps of continuously delivering crop material from the field into said chamber through a first end of the chamber to adjacent an opposite second end of the chamber, at least partially obstructing the delivery of crop material to adjacent the opposite second end of the chamber from time to time to distribute the crop material within the chamber between the ends thereof and thereby progressively form a stack of the crop material in the chamber, and continuously compacting the distributed crop material in a progressive manner back and forth between the ends of the chamber as said stack is being progressively formed in the chamber.

More particularly, the crop material is picked up and propelled from the field into the chamber and then at least partially deflected from time to time to distribute the material within the chamber between the ends thereof. Further, more particularly, the compact stack is formed on a mobile platform and an upper portion of the compact stack during its formation and compaction is continuously laterally supported as the compact stack grows in height on the platform.

The present invention further broadly comprises, in a machine for forming a compact stack of crop material such as hay or the like, the combination of a mobile chassis adapted to move across a field, a stack forming chamber mounted upon the chassis, means for continuously delivering crop material from the field into the chamber through a first end to adjacent an opposite second end of the chamber, means for at least partially obstructing the delivery of crop material to adjacent the opposite second end from time to time to distribute the crop material within the chamber between its ends and thereby progressively form a stack of the crop material in the chamber, packing means extending across the chamber and moveable between its ends to compact the distributed material as the stack is progressively formed in the chamber, and means for moving the packing means between the chamber ends.

More particularly, the obstructing means is positioned generally above the packing means and correspondingly moveable therewith between the chamber ends and comprises a moveable carriage means extending across the chamber and a baffle member moveably mounted on the carriage means which at least partially deflects crop material from time to time to distribute the material as the carriage means and the packing roll correspondingly move between the chamber ends.

Still more particularly, the stack forming chamber comprises a crop material receiving platform mounted on the chassis and a generally rectangular enclosure. Mounting means is coupled to the chassis for positioning the enclosure above the platform and for vertically displacing the enclosure from the platform, and thereby maintaining the enclosure only about an upper portion of the compact stack, as the stack grows in height on the platform. The enclosure has a roof structure positioned above the platform with a pair of spaced apart opposing sidewalls depending therefrom and a pair of endwalls respectively extending between corresponding opposite ends of the sidewalls. One of the endwalls is spaced from the roof structure so as to provide an opening therebetween through which the crop material may be delivered from the field to the platform.

Still further, more particularly, the packing means comprises a packing roll which extends across the enclosure between its sidewalls and is mountably coupled thereto at its opposite ends for movement between the chamber ends. The moveable carriage means is coupled at its lower end to the opposite ends of the packing roll and at its upper end to a guide channel which is formed in, and runs along, the roof structure of the enclosure. The baffle member is pivotally mounted on the carriage means generally above the packing roll and extends in a spaced relationship generally remote from the roll when the baffle member is in a first position such that the propelling crop material may pass between the packing roll and the baffle member and in an adjacent relationship to the roll when the baffle member is in a second position such that the propelling material is prevented from passing therebetween. During movement of the carriage means and packing roll between the chamber ends, the baffle member moves between its first and second positions and at least partially, from time to time, prevents the propelling crop material from passing between the baffle member and the packing roll and thus from reaching the opposite second end of the chamber. In such manner the baffle member distributes the material between the chamber ends.

The method and machine of the present invention provide for continuous, non-stop pickup and compaction of crop material into the form of a compact stack. The mode of distributing additional crop material onto previously distributed and compacted crop material of the stack being formed in the chamber facilitates the continuous smooth delivery of crop material from the field to the stack and simultaneously therewith, continuous progressive compaction of the crop material without uneven material build up on the stack or interference with the operation of the packing means. The enclosure of the stack forming chamber in serving only as lateral support for the upper portion of the compact stack reduces the overall sidewall weight and height of the chamber which improves machine stability on uneven terrains and contributes to the unloading of the compact stack from the machine platform without alteration or damage to the consolidated nature of the compact stack as would otherwise be caused by sidewall interference with the stack during its movement off the platform.

Other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which:

FIGS. 7 through 9 are schematic representations of the machine of FIG. 1, showing the operation of the machine, at various stages as it is moved across a field, in continuously picking up crop material and forming a compact stack of the material, and, in particular, schematically illustrating the one form of the mounting arrangement of the baffle member on the carriage frame, as shown in FIG. 2 and the respective positions of the baffle member in relation to the packing roll at various stages in the movement of the packing roll and carriage frame between the ends of the stack forming chamber;

DETAILED DESCRIPTION OF THE INVENTION

In the following description, right hand and left hand references are determined by standing at the rear of the machine and facing in the direction of forward travel. Also, in the following description, it is to be understood that such terms as "forward," "rearward," "left," "upwardly," etc., are words of convenience and are not to be construed as limiting terms.

IN GENERAL

Figure 1:
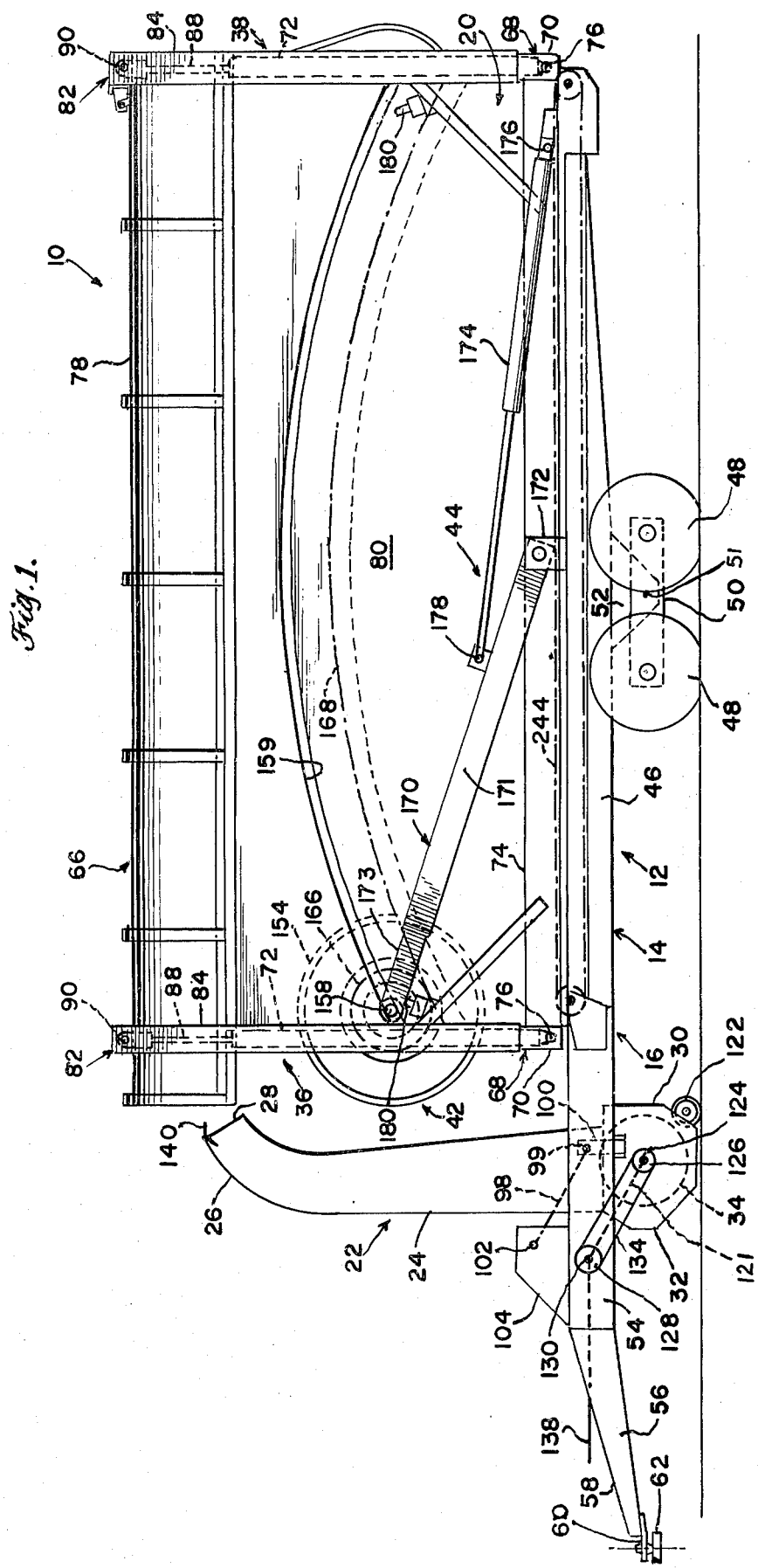
FIG. 1 is a side elevational view of a compact stack forming machine embodying the principles of the present invention, showing the machine in its position for beginning the compact stack forming operation.
Figure 2:
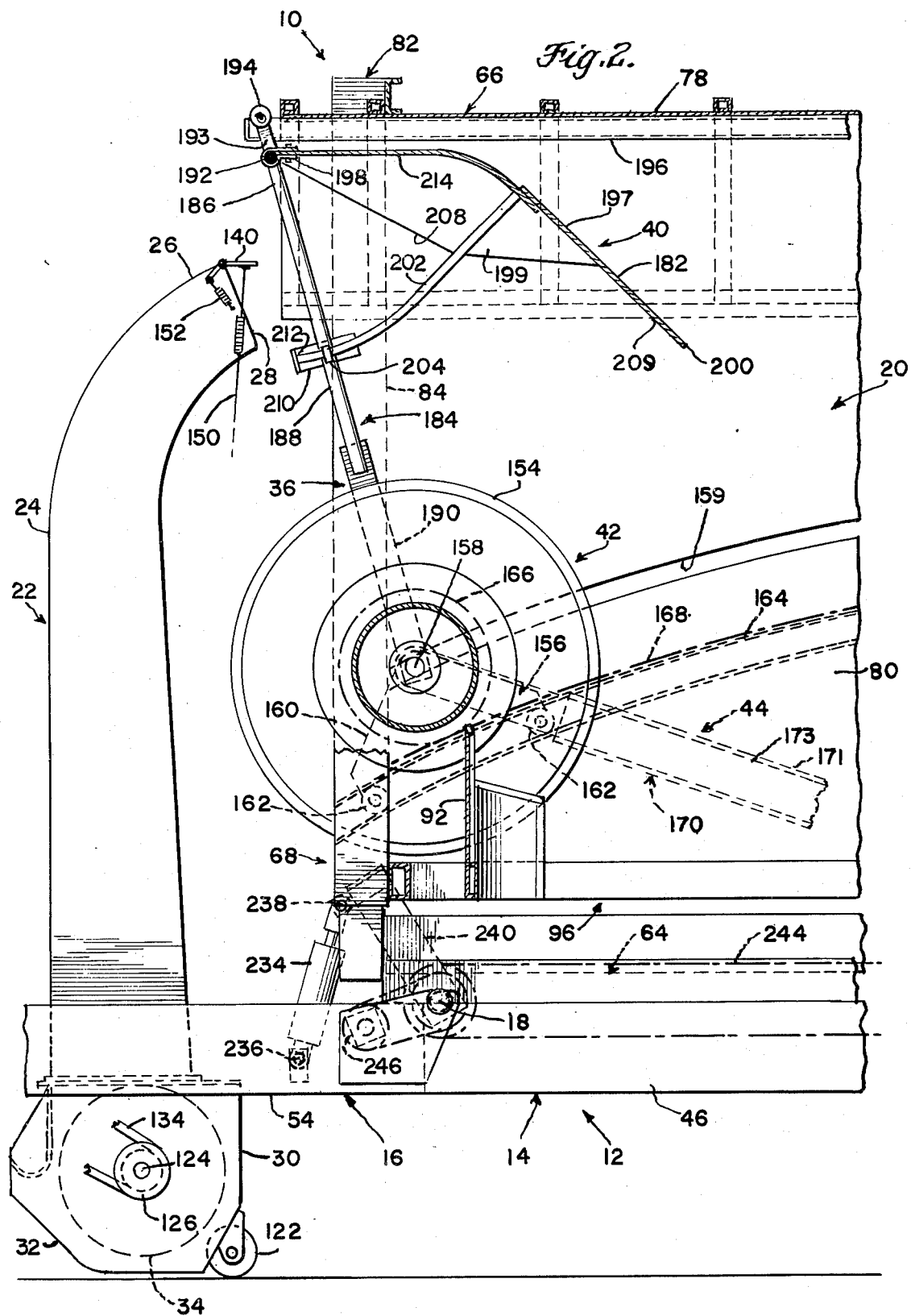
FIG. 2 is a fragmentary side elevational view of the machine, on a larger scale than of FIG. 1, showing the forward portion of the machine, with the baffle member in its first position remote from the packing roll, the enclosure of the stack forming chamber in its lowermost position adjacent the platform of the chamber, and the packing roll in its extreme forward position, prior to commencement of the stack forming operation.
Figure 3:
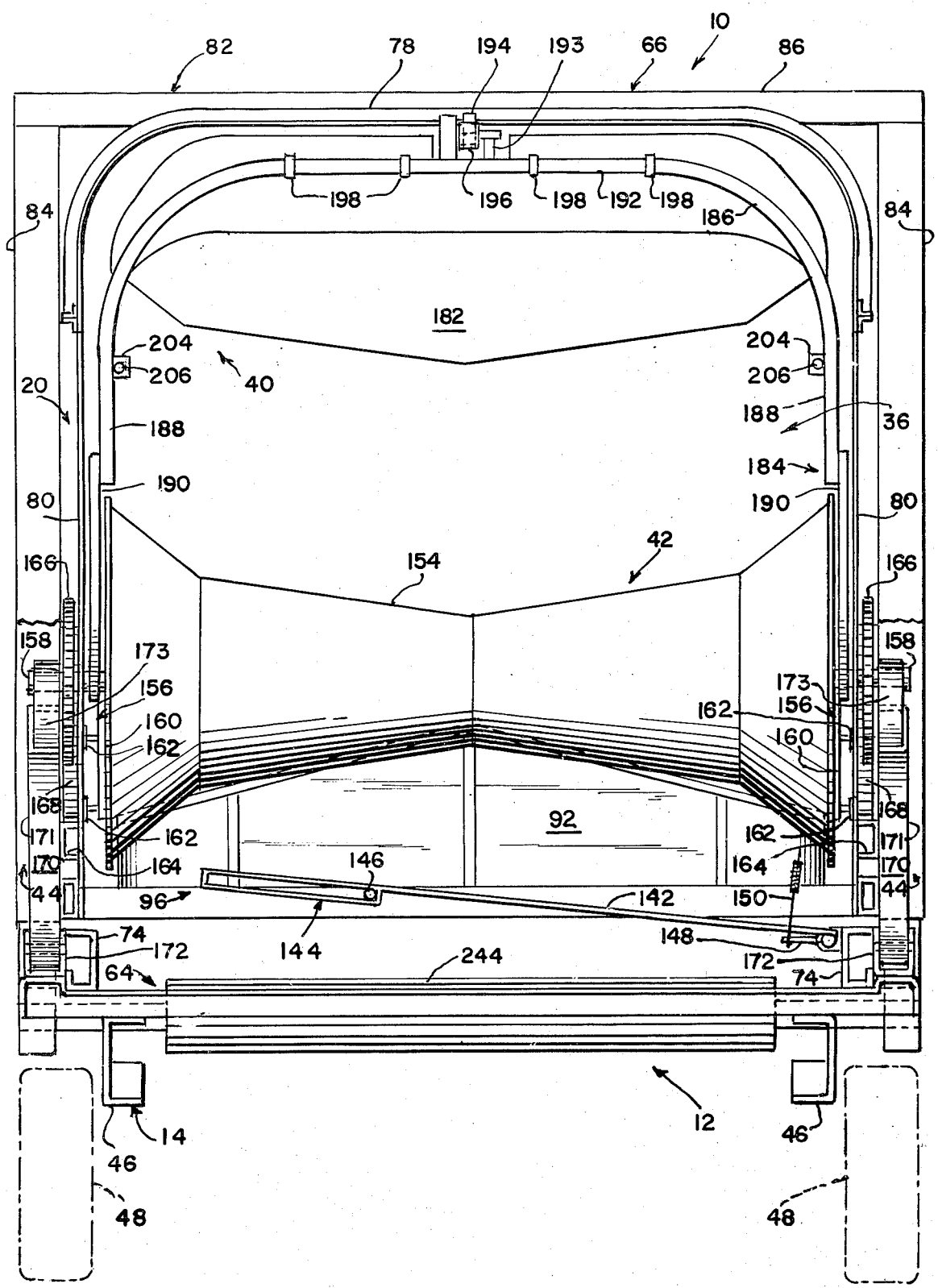
FIG. 3 is a front end elevational view of the machine of FIG. 1, on the same scale as that of FIG. 2, with the hitch frame, the upright delivery tube and the pickup omitted.

Referring now to the drawings, and particularly to FIGS. 1 through 3, there is shown a machine for forming a compact stack of crop material such as hay or the like, the machine being indicated generally by numeral 10 and forming the preferred embodiment of the present invention (the left side of the machine being shown in FIG. 1 when one is standing to the rear of the machine and facing in the direction of forward travel).

The machine 10 is provided with a mobile chassis, generally indicated at 12, which is formed in two sections including a main frame 14 and a hitch frame 16. The main frame 14 and hitch frame 16 are pivotally mounted together at a location, generally designated at 18, at each side of the chassis 12.

Also, the machine 10 is provided with a stack forming chamber, generally indicated by numeral 20, being mounted on the main frame 14 of the chassis 12. A crop material delivery means, generally indicated by numeral 22, is provided on the machine 10 which delivery means 22 includes an upright delivery tube 24 being mounted on the hitch frame 16 forwardly of the chamber 20 and having an upper end 26 defining an opening 28 facing rearwardly toward the chamber 20 and a lower end 30 located adjacent the field which constitutes a housing 32 within which is mounted a pickup 34.

Referring now to FIGS. 7, 8, 12 and 13, as the mobile chassis 12 of the machine 10 is moved across the field with the machine in operating condition, the delivery means 22 continuously delivers crop material from the field into the chamber 20 through a first open end 36 of the chamber 20 to adjacent an opposite second end 38 of the chamber 20. More particularly, the pickup 34, being preferably of the flail type continuously picks up crop material from the field and propels it upwardly through the hollow delivery tube 24, through the upper tube opening 28 and through the first open end 36 toward the opposite second end 38 of the chamber 20 with sufficient velocity to substantially reach the second chamber end 38.

An obstructing means, generally designated 40 and clearly shown in FIGS. 2 and 3, is provided within the chamber 20 of the machine 10 extending transversely thereacross and being moveable between the chamber ends 36, 38 as schematically illustrated in FIGS. 7 to 9, 12 and 13, for at least partially obstructing the propelling crop material from being delivered to adjacent the second chamber end 38 from time to time to distribute the crop material within the chamber 20 between its ends 36, 38 and thereby progressively form a stack of the crop material in the chamber 20. Also, extending transversely across the chamber 20 is a packing means, generally indicated 42, which is provided generally below the obstructing means 40 and is continuously moved by moving means, generally designated 44, between the first and second chamber ends 36, 38 as schematically illustrated in FIGS. 7 to 9, 12 and 13, to compact the crop material distributed within the chamber 20 as the stack is progressively formed therein.

CHASSIS

Turning again to FIGS. 1 and 2, the main frame 14 of the chassis 12 is formed of left and right longitudinally extending rails 46 (see also FIG. 3) and transverse rails (not shown) which interconnect the longitudinal rails 46. Each of the longitudinal rails 46 is supported by a pair of tandemly arranged wheels 48 being respectively rotatably mounted at opposing ends of a common member 50 (of which only the left one is shown in FIG. 1). The common members 50 are respectively pivotally journalled at point 51 to lower ends of brackets 52 (of which only the left one is shown in FIG. 1) being fixed respectively to, and extending below, the longitudinal rails 46.

Figure 4:
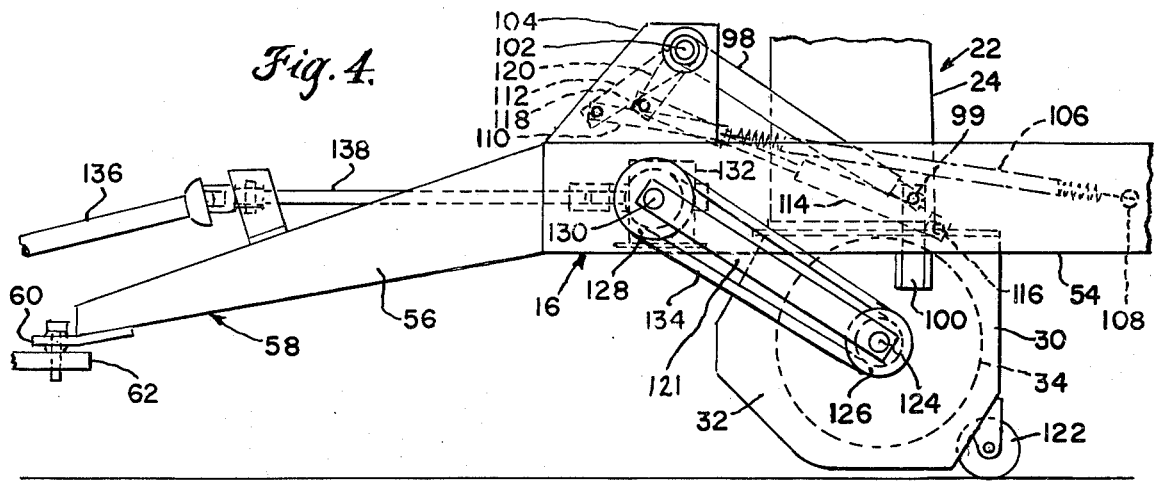
FIG. 4 is an enlarged fragmentary side elevational view of the hitch frame of the machine of FIG. 1, showing lift and suspension components for the pickup housing and crop material delivery tube and drive components for the pickup.

The hitch frame 16 of the chassis 12 is formed of left and right longitudinally extending side members 54 (of which only the left one is shown in FIGS. 1, 2 and 4) and forward cross member (not shown) which interconnects the side member 54. A pair of short beams 56 (of which only the left one is shown in FIGS. 1 and 4) are fixed to an intermediate portion of the forward cross member and convergently extend forwardly therefrom and merge together at their forward ends to form a tongue, generally indicated 58, having a hitch element 60 fixed thereon which adapts the mobile chassis 12 to be secured to a tractor having a drawbar 62, or other towing vehicle, located at the front thereof.

As described hereinbefore, the main frame 14 and the hitch frame 16 are pivotally mounted together at location 18 by suitable fastening means at each side of the chassis 12 where the corresponding adjacent ends of the respective left and right rails 46 and of the respective left and right side members 54 overlap each other to a limited extent. The structure and purpose for the aforementioned pivotal mounting arrangement will be described and become apparent in connection with the stack unloading operation hereinbelow.

STACK FORMING CHAMBER

The stack forming chamber 20 includes a generally rectangular crop material receiving platform 64 mounted on the base frame 14 of the chassis 12 between the longitudinal rails 46 and a generally rectangular enclosure 66 supported above the platform 64 by mounting means, generally indicated 68, taking the form of an upright support post 70 housing a hydraulic cylinder 72 and being located adjacent each one of the four corners of the platform 64.

The support posts 70 are respectively mounted in their upright position on opposite ends of left and right longitudinally extending channels 74 respectively fixedly mounted along opposite sides of the platform 64, each of the channels 74 being clearly shown in FIG. 3. Each of the hydraulic cylinders 72, being housed within one of the posts 70, is securely coupled at its lower end at location 76 to the lower end of one of the posts 70.

The enclosure 66 includes a hood or roof structure, generally indicated at 78, closing its top and spaced above the platform 64. Spaced apart left and right opposite sidewalls 80 are fixed to and depend from the roof structure 78 toward the platform 64.

Upwardly along the corresponding front and rear ends of the sidewalls 80 and over the respective front and rear ends of the roof structure 78 which correspond respectively to the front and rear ends of the sidewalls 80 are respectively secured and extend hanger frame structures 82 of the mounting means 68 which each include a pair of vertical guide channels 84 affixed to, and depending from, opposite ends of a horizontal beam 86. Each of the guide channels 84 are telescopically received on one of the support posts 70. An upper terminal end of a piston rod 88 of each hydraulic cylinder 72 housed within each support post 70 is secured at location 90 to the upper end of each guide channel 84. It is, therefore, readily apparent that selected simultaneous actuation through suitable hydraulic controls (not shown) of the hydraulic cylinders 72 causes simultaneous extension (or retraction) of the piston rods 88 and upward (or downward) sliding movement of the guide channels 84 relative to the support posts 70 which accordingly vertically displaces the enclosure 66 from (or toward) the platform 64.

Figure 6:
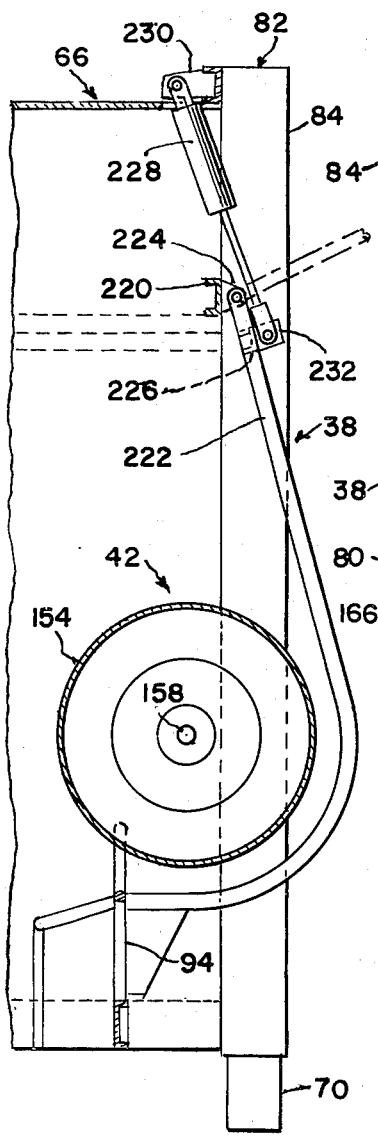
FIG. 6 is a fragmentary sectional taken along line 6—6 of FIG. 5, showing, in side elevation, the pivotal mounting arrangement of the enclosure rear endwall in relation to the packing roll when the packing roll is in its extreme rearward position.
Figure 5:
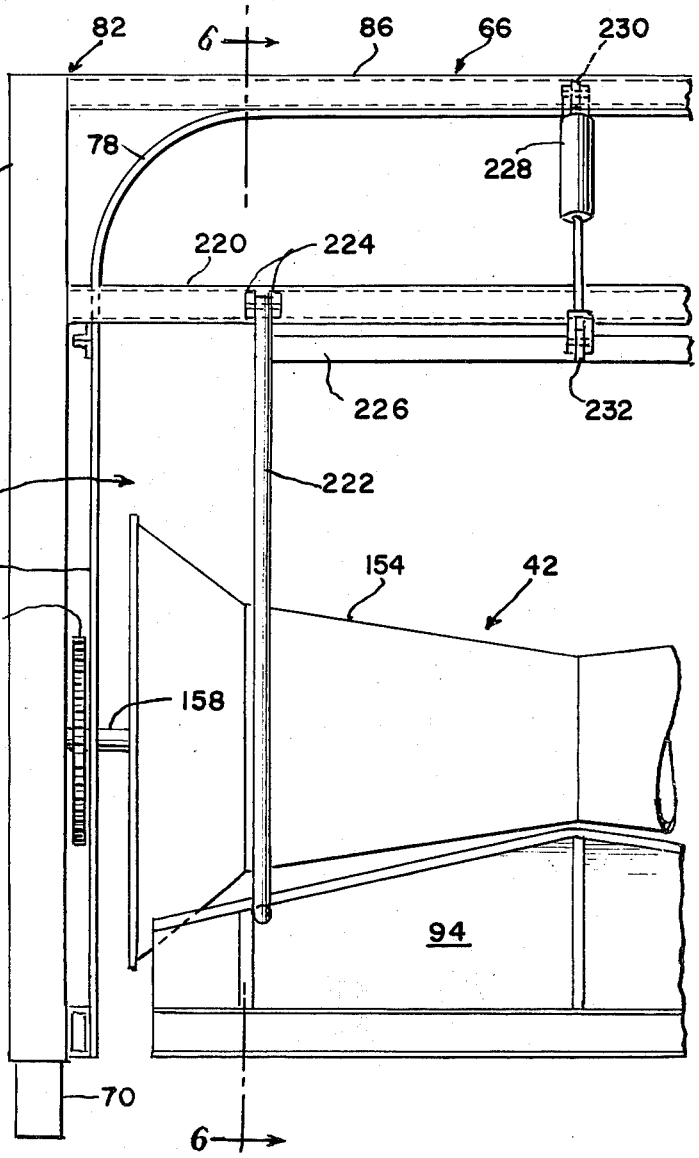
FIG. 5 is an enlarged fragmentary rear end elevational view of the machine of FIG. 1, showing the pivotal mounting arrangement of the rear endwall of the enclosure of the stack forming chamber.

The enclosure 66 further includes a front endwall 92 extending between, and suitably coupled at its opposite ends to, the lower corresponding front ends of the sidewalls 80, as shown in FIGS. 2 and 3. The front endwall 92 is spaced below the front end of the roof structure 78 so as to define a substantial opening therebetween. Also, the enclosure 66 includes a rear endwall 94 extending between the lower corresponding rear ends of the sidewalls 80 as shown in FIGS. 5 and 6. The pivotal mounting arrangement of the rear endwall 94 and the purpose therefor will be described and become apparent in connection with the description of the operation of unloading a completed compact stack from the machine 10 hereinafter. Also, other structural features of the platform 64 and the enclosure 66 and their importance will be described and become apparent in connection with the description of other parts of the machine 10 which follow hereinafter.

Figure 13:
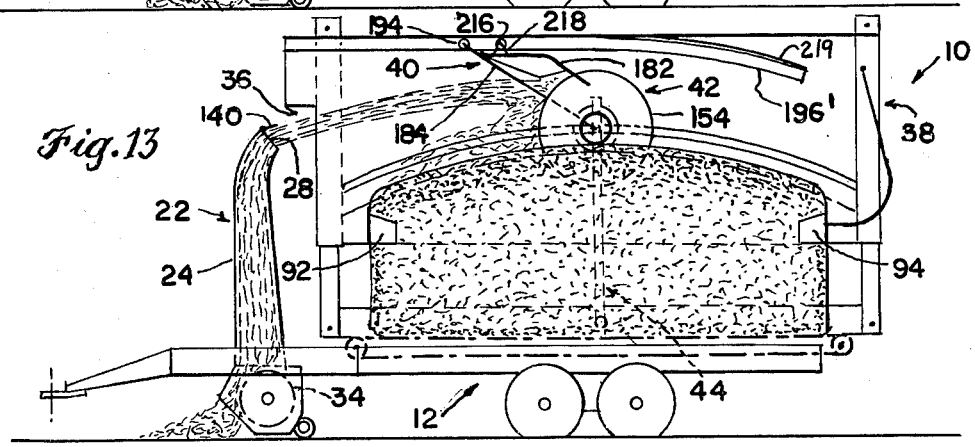

The enclosure 66 is open at its bottom, being generally designated 96 in FIG. 3. The platform 64 provides a bottom for the enclosure 66 when the machine 10 is set up, as shown in FIGS. 1 through 3, for the commencement of the formation of a stack in the chamber 20. However, as the stack is being formed during which process it progressively grows in height, selected actuation (extension) of the hydraulic cylinders 72 elevates, or vertically displaces, the enclosure 66 from the platform 64 and, in this manner, maintains the enclosure 66 positioned about an upper portion of the stack, as is schematically illustrated in FIGS. 8, 9 and 13. In being so maintained about the upper stack portion, the sidewalls 80 and front and rear endwalls 92, 94 of the enclosure 66 provide lateral support for the upper stack portion which facilitates the continuous compaction of additional loose crop material onto the upper portion of the stack by the packing means 42 as will be explained in detail hereinafter. It has been found in the present invention that it is not necessary to provide lateral support for the entire stack in order to form a compact stack having acceptable integrity. Furthermore the benefits to be gained by the provision of what might be called "abbreviated sidewalls" for the stack forming chamber 20 will again be discussed in the description of the operation of unloading the completed stack from the machine 10.

CROP MATERIAL DELIVERY MEANS

As seen in FIG. 1, and in more detail in FIG. 4, the crop material delivery means 22 is supported on the hitch frame 16 of the chassis 12. More particularly, the hollow delivery tube 24 of delivery means 22 is supported by a pair of left and right upper link arms 98 (only the left upper link arm being shown in FIGS. 1 and 4) each of which being pivotally connected at one end at 99 to a brace 100 fixed on opposite sides of the tube 24 and fixed at the opposite other end to a cross pipe 102 adjacent each opposite end thereof. The pipe 102 is rotatably mountably coupled at its opposite ends respectively to opposite upstanding plates 104 (only the left plate being shown in FIGS. 1 and 4) which are fixed to the forward end portions of side members 54.

For further aiding in the support of the tube 24 on the hitch frame 16, a flotation spring 106 is arranged on each side of the tube 24 (only the left spring being shown in FIG. 4). Each of the springs 106 is securely fastened at 108 to the rearward end portion of one side member 54 and pivotally connected through a link element 110 to a crank arm 112 being fixed at one of the opposite end portions of the cross pipe 102.

For still further aiding in the support of the tube 24 on the hitch frame 16 and for use in raising and lowering the tube 24 in relation to the hitch frame 16, a hydraulic cylinder 114 is arranged either on just one or on both sides of the tube 24. The cylinder 114 is pivotally connected at its one cylinder end at 116 to one of the side members 54 and pivotally connected at its other piston end at 118 to the outer end of a bell crank 120 being fixed also to the cross pipe 102 adjacent one end portion thereof.

Finally, for additionally aiding in the support of the delivery tube 24 on the hitch frame 16 and for maintaining the tube 24 in an upright disposition in relation to the hitch frame 16 at all times including occasions of raising and lowering the tube 24 upon actuation of the hydraulic cylinder 114, a pair of left and right lower link arms 121 (only the left lower link arm being shown in FIGS. 1 and 4) is provided. Each lower link arm 121 extends parallel to a corresponding one of the upper link arms 98, is approximately equal thereto in length and is pivotally connected at one end to one side of the housing 32 and pivotally coupled at the opposite end to the forward end portion of one side member 54. Thus, the respective pivotal axes of the opposite ends of the upper and lower link arms 98, 121 define a parallelogram therebetween.

Thus, it is readily apparent in FIG. 4 that contraction of the hydraulic cylinder 114 causes counterclockwise rotation of the pipe 102 and lifting of the tube 24 by the upper link arms 98 while the counterclockwise parallel pivotal movement of the upper and lower link arms 98, 121 maintains the tube 24 in its upright disposition as it is being lifted upwardly.

Conversely, when the hydraulic cylinder is relaxed or permitted to extend, the tube 24 will automatically lower in relation to the hitch frame 16 because of the weight of the tube 24 and causes the upper link arms 98 and pipe 102 to rotate clockwise until a support roller 122 being rotatably mounted at the lower rear end of the housing 32 of the tube 24 engages the ground. During lowering of the tube 24, the clockwise parallel pivotal movement of upper and lower link arms 98, 121 maintains the tube 24 in its upright disposition and the flotation springs 106 extend against their inherent bias and assist the ground roller 122 in supporting the weight of the tube 24, especially when uneven terrain is encountered as the machine 10 moves across the field.

A suitable drive arrangement is provided for the pickup 34 so that its operation is not adversely affected by the vertical movement of the tube 24. The pickup 34 has a shaft 124 extending in a transverse relation to the direction of machine movement and journalled at its opposite ends to opposite sides of the housing 32 for rotation about an axis coincident with the pivotal axis of the one end of lower link arm 121 and in a clockwise direction as viewed in FIG. 4. One end of the shaft 124, that being the left end as seen in FIGS. 1 and 4, extends beyond the corresponding one side of the housing 32 and fixedly mounts a sheave 126 which is drivingly coupled to a sheave 128 on the output drive shaft 130 of a gear box 132 by a drive belt 134. The output drive shaft 130 rotates about an axis coincident with the pivotal axis of the opposite end of lower link arm 121. The gear box 132 is mounted on the front portion of the hitch frame 16 and drivingly coupled to the power takeoff shaft (not shown) of the towing vehicle by input shaft 136 incorporated in drive train shafts and joints 138 of the machine 10.

Thus, the operation of the pickup 34 will not be adversely affected since, during vertical movement of the tube 24, the motion of the centerline or rotational axis of the pickup shaft 124 is in an arc having a constant radius about the center line or rotational axis of the output drive shaft 130 of the gear box 132, with the drive belt 134 being maintained at a constant length by the lower arm link 121.

As stated hereinbefore, the pickup 34 is preferably the flail type which is generally well known in the art. Such type of pickup functions to lift and throw crop material from the ground upwardly through the delivery tube 24 and also creates a substantial flow of air upwardly through the tube 24 which has the combined effect of propelling the crop material at a substantial velocity through the tube 24.

The upper end 26 of the tube 24 is suitably curved rearwardly toward the chamber 20 to direct the upwardly propelling crop material through an approximately 65 degree bend and through the tube opening 28 toward the chamber 20.

A deflector plate 140 is pivotally mounted along the top horizontal edge of the tube opening 28 for further regulating the trajectory or path of the propelling crop material as it emanates from the tube 24 and flows into the chamber 20. The deflector plate 140 is coupled to the enclosure 66 such that the angular position of the deflector plate 140 with respect to the stream of crop material propelling from the tube 24 changes as the enclosure 66 is raised or lowered in relation to platform 64. The coupling arrangement, best shown in FIGS. 2 and 3, comprises a transverse arm 142 pivotally mounted at one end to the forward end of the left longitudinally-extending channel 74 and having a slot 144 defined along its opposite end which receives a pin 146 projecting outwardly from the front end wall 92. The arm 142 has a short finger portion 148 fixed thereto adjacent the one end of the arm 142 which portion 148 is interconnected to the deflector plate 140 by a cable 150 (only the upper and lower portions of the cable 150 respectively secured to the deflector plate 140 and the finger portion 148 being shown respectively in FIGS. 2 and 3).

The deflector plate 140 is noramlly biased by spring 152 to extend at an angular position generally parallel to the stream of crop material propelling from the tube 24 (see FIG. 9) whereby the deflector plate 140 does not significantly deflect the stream of crop material. Such is the case when the enclosure 66 is in its uppermost elevated position with respect to the platform 64, as seen in FIG. 9, and the transverse arm 142 has pivoted from its generally horizontal position of FIG. 3 clockwise through an approximate 45 degree angle.

However, when the enclosure 66 is in its initial lowermost position with respect to the platform 64, as seen in FIGS. 2, 3 and 7, the deflector plate 140 is pulled by the finger portion 148 via its interconnection therewith by the cable 150 against the bias of the spring 152 and positioned to angularly extend partially across the stream of crop material propelling from the tube 24 (see FIG. 7) whereby the plate 140 deflects the stream of crop material into a trajectory or path having a lower maximum elevation than that shown in FIG. 9 when the plate 140 does not deflect the stream. Thus, it is readily apparent that even though the enclosure 66 is selectively elevated or displaced vertically from the platform 64 as the stack of crop material grows in height on the platform 64, the angular position of the deflector plate 140 is correspondingly changed to maintain the stream of crop material propelling into the enclosure 66 of the chamber 20 and toward the obstructing means 40 therein, as desired.

PACKING MEANS AND MOVING MEANS THEREFOR

As the crop material is propelled into the enclosure 66 of the chamber 20 toward the second chamber end 38, it is at least partially obstructed by means 40, as will be described in detail hereinbelow, from being delivered to adjacent the second chamber end 38 from time to time to thereby distribute the crop material within the chamber 20 between its ends 36, 38 and progressively form a stack of the crop material in the chamber 20.

As the stack being formed in the chamber 20 and supported on the platform 64 progressively grows in height as a result of the continuous distribution of additional crop material along the top of the stack by the obstructing means 40, packing means 42, extending transversely across the chamber 20 between left and right sidewalls 80 of the enclosure 66, is continuously moved by moving means 44 between the first and second chamber ends 36, 38 and progressively compacts the additional distributed crop material against the top of the stack.

The packing means 42 is comprises by a packing drum or roll 154, being preferably formed of oppositely-arranged and interconnected outer and inner pairs of truncated conical sections, and a pair of carriages 156, each being positioned adjacent to one of the opposite ends of the roll 154, which rotatably mount the packing roll 154 by respectively rotatably mounting shafts 158 fixed to and extending outwardly from the opposite ends of the roll 154.

The carriages 156, as more particularly shown in FIGS. 2 and 3, are each comprised by a triangular plate section 160 being rotatably journalled at its upper middle apex to one of the roll shafts 158 and having a roller 162 positioned outwardly from, and rotatably journalled to, each of its pair of opposite lower side apices. The pair of rollers 162 of each plate section 160 fit within and run along one of a pair of oppositely facing guide rails 164 formed in and extending in an arcuate manner along opposite sidewalls 80 of the enclosure 66 between the ends 36, 38 thereof to thereby mountably couple the packing roll 154 across the enclosure 66 for movement by the moving means 44 along the arcuate path between the ends 36, 38 of the enclosure 66.

Each of the roll shafts 158 further extends outwardly through an arcuate slot 159 formed in each of the sidewalls 80 of the enclosure 66. Further, fixedly journalled to each one of the roll shafts 158 adjacent to, but outwardly of, the respective one of the plate sections 160, is a sprocket 166 which interfits with, and positively rotates as it runs along, a toothed or link chain-like track or rack 168, being formed along the top of each of the guide rails 164 and adjacent the exterior side of each of the sidewalls 80. Therefore, as the moving means 44 moves the packing roll 154 between the ends 36, 38 of the enclosure 66, positive rotation of the packing roll 154 about an axis defined by its shafts 158 is achieved simultaneously with the movement of the packing roll 154 along the arcuate path defined by the guide rails 164. Also, the pairs of sprockets 166 and chain-like tracks or racks 168 promote the maintenance of proper alignment of the roll 154 across the enclosure 66 as the roll 154 is moved between the ends 36, 38 of the chamber 20.

The moving means 44 for the packing means 42 is comprised by a pair of driving rocker arms 170 being provided respectively outwardly along opposite sides of the chamber 20. Each of the rocker arms 170 is composed of telescoping lower and upper sections 171, 173 with the lower section being pivotally mounted by a U-shaped bracket 172 being fixed on each of opposing longitudinally-extending marginal side portions of the platform 64, midway between the front and rear ends of the platform 64, and fixed to each of the longitudinally extending channels 74 outwardly of the respective channel 74 being fixedly mounted along the respective opposite side of the platform 64.

The upper telescoping section 173 of each rocker arm 170 is rotatably journalled to the outer terminal end of one of the pair of opposite roll shafts 158, adjacent to and outwardly from one of the pair of sprockets 166. The telescoping relationship of the two sections 171, 173 of each rocker arm 170 and a longitudinally-extending inwardly opening slot (not shown) formed in each lower arm section 171 allows the upper arm section 173 to slide relative to the lower arm section 171 simultaneously as the arms 170 continuously move the packing roll 154 between the ends 36, 38 of the enclosure 66 along the arcuate path defined by the guide rails 164. When the enclosure 66 is in its lowermost position with respect to the platform 64, as shown in FIGS. 1 and 7, the upper arm section 173 has actually totally disappeared from view to within the lower arm section 171 when the arms 170 reach the middle position of their stroke, generally perpendicular to the platform 64, during their swinging pivotal movement between the chamber ends 36, 38. In other words, because of this telescoping relationship between the sections 171, 173 of the arms 170, there is no requirement that the pivotal axis of the arms 170 and the center of curvature of the arcuate path formed by guide rails 164 be coincident with one another.

Each of the rocker arms 170 is driven or cycled in the swinging pivotal fashion about the bracket 172 by a hydraulic cylinder 174 being pivotally connected at its one cylinder end at 176 to one longitudinal channel 74 adjacent a rearward end of one of the opposing marginal side portions of the platform 64 and pivotally connected at its other piston end at 178 to the lower telescoping section 171 of the one of the arms 170.

A double-acting hydraulic cylinder 174, being displaced by a variable flow of hydraulic fluid by suitable hydraulic circuitry (not shown), is utilized such that the velocity of movement of the outer end of the upper telescoping section 173 of each of the rocker arms 170, and thus the angular velocity of movement of the packing means 42 along the arcuate path, is substantially constant throughout its back and forth cycle between the ends 36, 38 of the chamber 20.

Also, a pair of sensors 180 are positioned respectively adjacent opposite forward and rearward ends of the opposing guide tracks 164 for engagement by the outer ends of the upper sections 173 of the rocker arms 170 when the packing roll 154 respectively reaches the forward and rearward ends 36, 38 of the chamber 20. The sensors 180 are appropriately incorporated into the hydraulic circuitry (not shown) which controls the flow of hydraulic fluid through the hydraulic cylinders 174 and thereby the particular mode of operation of the cylinders 174 at any given time. Preferably, upon engagement of either one of the sensors 180 by one of the arms 170, the direction of fluid flow through the cylinders 174, and thus the mode of operation of the cylinders 174, is reversed. Thus, the hydraulic cylinders automatically reverse their operation upon reaching either of the ends 36, 38 of the chamber 20.

The particular profile of the packing roll 154, as best shown in FIG. 3, as well as the arcuate path traversed thereby, promotes the formation of a compact stack having a dome-like curvature to its upper surface which provides resistance to wind erosion of the crop material from the stack and enhances the moisture-shedding characteristic of the crop material stack which both minimize the depth of material spoilage on the exterior surface of the stack. However, it is readily apparent that a roll having other profiles may be utilized as desired.

OBSTRUCTING MEANS

For progressively distributing the propelling crop material streaming into the chamber 20, from the delivery tube 24, between the ends 36, 38 of the chamber 20, obstructing means 40, being positioned generally above the packing roll 154, is correspondingly moved with the packing roll 154 between the chamber ends 36, 38 by the moving means 44.

The obstructing means, as clearly shown in FIGS. 2 and 3, is generally comprised by a baffle member 182 and moveable carriage frame 184 which extends across the chamber 20 above the packing roll 154 and pivotally mounts the baffle member 182. The carriage frame 184 comprises an inverted U-shaped tube 186 with its opposite, depending side legs 188 each being fixedly connected to a flat extension piece 190 which is pivotally coupled respectively to one of the roll shafts 158 between the correspondingly located plate section 160 and sprocket 166 on each opposite end of the packing roll 154. An upper base 192 of the inverted U-shaped tube 186, which base 192 interconnects the side legs 188, rigidly mounts at approximately its mid-point an upwardly-extending bracket 193 which, in turn, rotatably mounts a roller 194 at its upper end. The roller 194 is confined within, and capable of running along, a longitudinally-extending guide channel 196 defined along the centerline, and on the interior side, of the hood or roof structure 78 of the enclosure 66. In such manner, therefore, the carriage frame 184 is mounted by, and coupled between, the packing roll 154 and the enclosure 66 and correspondingly moveable with the packing roll 154 relative to the enclosure 66 forwardly and rearwardly between its ends 36, 38.

The baffle member 182 is formed of an arcuate-shaped, transversely extending deflector section 197 and a pair of opposing side wing sections 199 respectively extending forwardly from opposite lateral ends of the deflector section 197. The baffle member 182 is pivotally coupled along the upper horizontal edge margin of its deflector section 197 to the upper base 192 of the tube 186 by a series of spaced apart clamps 198. The baffle member 182 may pivot between a first, raised position, such as shown in FIGS. 2, 3, 7 and 12, and second, lowered position, such as shown in FIGS. 8 and 9.

In its first position, the baffle member 182 extends from the upper base 192 of the tube 186 in a spaced relationship generally remotely located from the packing roll 154 such that crop material propelling through the first or front end 36 of the chamber 20 is not deflected by the baffle member 182 and, thus, is prevented from spilling out of chamber 20 from in front of roll 154 when the roll 154 is located adjacent front chamber end 36 by being allowed to stream between the baffle member 182 and the packing roll 154 toward the opposite second or rear end 38 of the chamber 20.

In its second position, the baffle member 182 extends from the upper base 192 of the tube 186, transversely across the path of the propelling crop material and to generally adjacent the upper side of the packing roll 154 at the terminal edge 200 of the baffle member 182. Thus, depending on the location of the packing roll 154 and the carriage frame 184 along the arcuate path they both traverse, the baffle member 182 when in its second position will generally substantially prevent the propelling crop material from streaming or flowing past the packing roll 154 and thus from reaching the opposite second or rear end 38 of the chamber 20. Of course, obviously when the packing roll 154 is located adjacent the second end 38 of the chamber, the crop material will reach the second chamber end 38 even though the baffle member 182 is located at its second, lowered position.

In essence, the pivoting sequence of the baffle member 182 between its first and second positions in relation to the packing roll 154 is so arranged to provide a desired pattern of uniform longitudinal distribution of crop material between the chamber ends 36, 38.

Generally, two alternative forms of mounting arrangements are disclosed for effectuating the pivotal movement of the baffle member 182 between its respective first and second positions.

The first form of the mounting arrangement is illustrated in FIGS. 2, 3 and 7 and comprises a pair of side rods 202 fixed respectively along, and extending arcuately forwardly of, the side wing sections 199 of the baffle member 182. A pair of tabs 204, as clearly seen in FIG. 3, are respectively fixed to the pair of side legs 188 of the U-shaped tube 186, project inwardly toward each other and each have a guide opening 206 defined therein aligned to receive one of the side rods 202 slideably therethrough, as seen in FIG. 2.

When the packing roll 154 is at its second position, as illustrated in FIGS. 8 and 9, the forward edges 208 of the side wing sections 199 of the baffle member 182 rest against the tabs 204. The weight of the baffle member 182 retains it in this resting position as the packing roll 154 moves between a position near the forward end 36 of the chamber 20 and the rearward end 38 of the chamber 20. The weight of the baffle member 182 is great enough that it will not be forced to pivot rearwardly by the force of the infeeding stream of crop material. The lower end 209 of the deflector section 197 nearest the packing roll 154 maintains an approximate 10:30 o'clock relationship with the circumference of the packing roll 154 when the baffle member 182 is at its second position.

When the packing roll 154 nears its most extreme forward position, the side rods 202 respectively engage a pair of stop brackets 210 fixedly mounted respectively to the forward pair of vertical guide channels 84 of forward hanger frame structure 82. A stop surface 212 is formed on each bracket 210 forwardly of, and aligned with, the corresponding one of the guide openings 206 of the tabs 204 and engaged by the forward end of the corresponding one of the side rods 202. Once the packing roll 154 has reached its extreme forward position, as illustrated in FIGS. 2 and 7, the baffle member 182 has completely pivoted from its second, lowered position to its first, raised position with an upper end 214 of the deflector section 197 of the baffle member 182 positioned adjacent and generally parallel to the guide channel 196 along the roof structure 78 of the enclosure 66. When the packing roll 154 reverses its cycle and begins its movement rearwardly, the baffle member 182 pivots toward its second, lowered position; and when the forward edges 208 of the side wing sections 199 come to rest against the tabs 204, the arcuate side rods 202 then disengage from the stop brackets 210.

Figure 12:
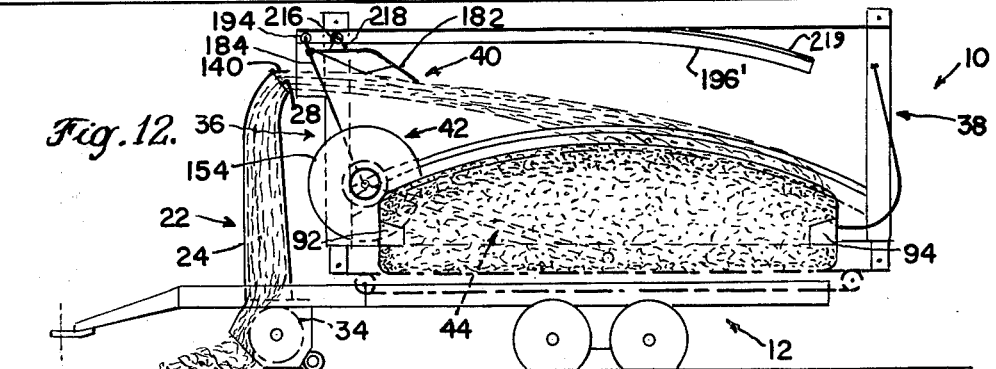
FIGS. 12 and 13 are schematic representations of the machine of FIG. 1, showing the machine in stages of its operation identical to those shown respectively in FIGS. 9 and 10, and, in particular, schematically illustrating another form of the mounting arrangement of the baffle member on the carriage frame and on the roof structure of the enclosure and the respective positions of the baffle member in relation to the packing roll at the various stages in the movement of the packing roll and carriage frame between the ends of the stack forming chamber.

The second form of the mounting arrangement is illustrated in FIGS. 12 and 13 and differs from the first form in that the arcuate side rods 202 are eliminated and a second roller 216 is added being rotatably mounted to the rear side of the upper end 214 of the deflector section 197 by a bracket 218 fixed along the centerline of the upper end 214 adjacent to, but rearwardly of, the first roller 194. The second roller 216 runs along and is confined within the same guide channel 196' as the first roller 194.

In this second form the packing roll 154 must travel rearwardly from its extreme forward position through a greater distance than that travelled in the first form in order for the baffle member 182 to complete its pivotal movement from its first, raised position of FIG. 12 to its second, lower position of FIG. 13. For instance, this is readily apparent by comparing the position of the baffle member 182 in FIG. 8, wherein it has already reached its second position, with the position of the baffle member 182 in FIG. 13, wherein it has not yet completely reached its second position, the respective positions of the packing roll 154 being identical in FIGS. 8 and 13. Accordingly, in the second form, crop material is allowed to pass by the packing roll 154 and on toward the second chamber end 38 during a greater portion of the path of travel of the packing roll 154, than in the case of the first form, which has been found to improve the uniformity of longitudinal distribution of the crop material between the ends 36, 38 of the chamber 20.

Additionally, it should be noted that the profile of channel 196' more nearly corresponds to the profile of the arcuate path traversed by the packing roll 154 in the rearward half of the chamber 20 in order to maintain the baffle member 182 in its second, lowered position during its movement through the rearward half of the chamber 20. Also, in each of the first and second mounting arrangement forms, as seen in FIGS. 7 to 9, 12 and 13, a secondary baffle or deflector 219 is permanently positioned above the rearward, downwardly-curving portions of guide channels 196, 196' extends transversely across the chamber 20 and is fixed at its opposite ends and along its upper edge respectively to the sidewalls 80 and roof structure 78 of the enclosure 66 so as to prevent the passage of propelling crop material above the baffle member 182 during its movement through the rearward half of the chamber 20.

COMPACT STACK FORMING OPERATION

FIGS. 7 through 9 schematically illustrate the operations of the machine 10 as it moves across the field in continuously picking up crop material and progressively forming a large, compact stack of the crop material.

FIG. 7 represents the stacking forming operation after the foundation of a compact stack has been formed on the platform 64. Windrowed crop material is being continuously lifted from the field by pickup 34 and propelled upwardly through the delivery tube 24 and directed by delivery tube 24 and deflector plate 140 through a 90 degree turn and rearwardly through the open forward end 36 of the chamber 20 between the baffle member 182 and the packing roll 154, then onwardly to the rearward end 38 of the chamber 20.

FIGS. 8 and 9 represent respectively the stack nearing its final height and then at its final height. In FIG. 8, the baffle member 182 blocks passage of the crop material and distributes it along the top of the stack as the packing roll 154 compacts previously distributed crop material. Also, each of FIG. 8 and 9 illustrate the enclosure 66 after it has been vertically displaced, along with packing roll 154 and baffle member 182, to successively greater heights after desired levels of density have been repetitively reached. Such elevating may be accomplished by the selective manual operation of suitable remotely-located hydraulic controls (not shown) by the operator or automatically by suitably pressure sensing means (not shown) incorporated into or associated with the hydraulic lift cylinders 72.

FIGS. 12 and 13 represent stages in the stack forming operation substantially similar to those illustrated in FIGS. 7 and 8.

STACK UNLOADING AND RETRIEVING OPERATIONS

Upon reaching the storage location, the rear endwall 94 must be pivoted rearwardly and upwardly before further unloading steps can be initiated. In the arrangement for pivotally mounting the rear endwall 94, as clearly illustrated in FIGS. 5 and 6, an overhead beam 220 is secured to, and interconnects, the pair of vertical guide channels 84 of the rear hanger frame structure 82 and extends generally parallel to, and is spaced a short distance from, the horizontal beam 86 of the rear structure 82. A pair of spaced apart, rearwardly-bowed vertical support rods 222 are fixed at their lower ends to the rear face of the endwall 94 and pivotally mounted at their upper ends respectively between pairs of rearwardly protruding tabs 224 (only the left pair being shown in FIG. 5) fixed to the overhead beam 220. A cross piece 226 fixedly interconnects the vertical support rods at their upper ends adjacent to their pivotal coupling to the pairs of tabs 224. For pivoting the endgate 94, a hydraulic cylinder 228 is pivotally connected at its cylinder end to a tab 230 fixed to the rear hanger frame structure 82 at approximately the mid-point of its length. The cylinder 228 is pivotally connected at its piston end to another tab 232 fixed to the crosspiece 226. Actuation (contraction) of the cylinder 228 by suitable hydraulic controls (not shown), pivotally moves the endgate 94 rearwardly and upwardly from its position of FIGS. 5 through 9 to its position of FIG. 10 (see also the broken line position of the upper end portion of the left vertical support rod 222 in FIG. 6).

Figure 10:
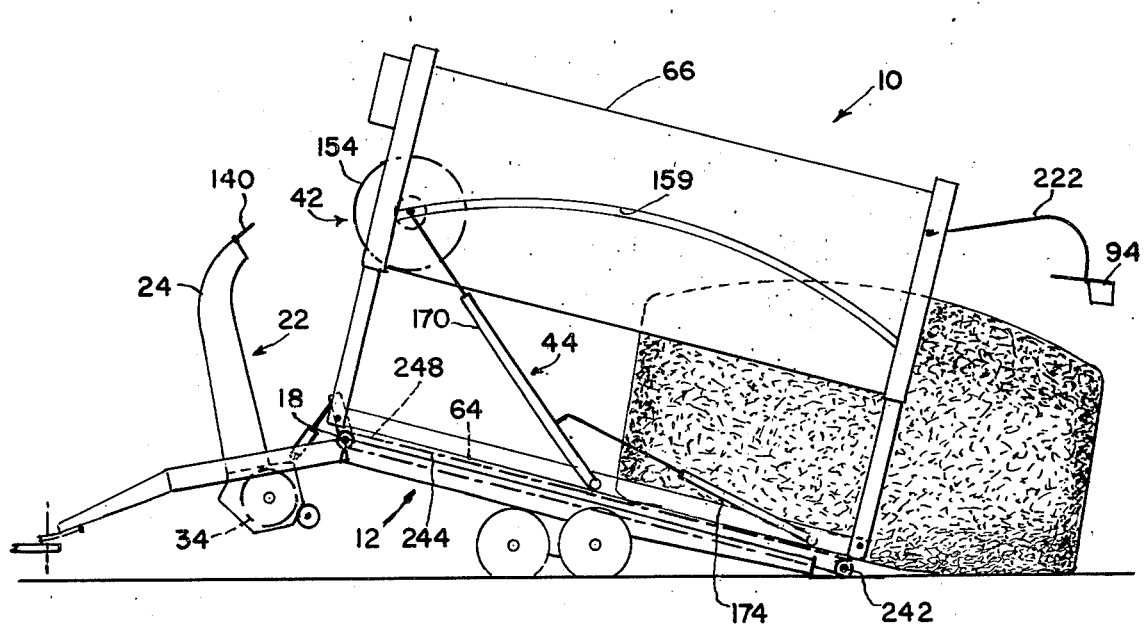
FIG. 10 is a schematic representation of the machine of FIG. 1, showing the machine in its position for unloading a completed compact stack of crop material.

After the endgate 94 has been pivoted to the position illustrated in FIG. 10, the rear end 38 of the chamber 20 is open and the stack is now free and clear of any obstruction to its ejectment from the machine 10. Upon tilting of the main frame 14 relative to the hitch frame 16, the stack may be readily unloaded from the machine 10.

As described hereinabove, the main frame 14 and hitch frame 16 are pivotally joined together at 18. A pair of jack knife hydraulic cylinders 234 (only the left cylinder being shown in FIG. 2) are pivotally journalled at their cylinder ends at 236 respectively to the rear end portions of the side members 54 and pivotally journalled at their piston ends at 238 to the outer ends of a pair of forwardly-inclined lift arms 240 which are fixed secured at their inner ends to the main frame rails 46. With the machine 10 being suitably secured to the towing vehicle (not shown), actuation (extension) through suitable hydrualic controls (not shown) of the hydraulic cylinders 234 causes counterclockwise pivoting of the hitch frame 16 and pivotal tilting of the main frame 14 about common members 50 at pivot point 51 whereby the chassis 12 is transformed from its operating condition of FIG. 1 to its unloading position of FIG. 10.

Tilting of the main frame 14 positions a discharge end 242 of the platform 64 adjacent the field. The platform 64 mounts a floor conveyor 244 which maybe driven by any suitably source of power, such as a reversible hydraulic motor 246.

Accordingly, through simultaneous forward movement of the machine 10 and operation of the floor conveyor 244 such that an upper course 248 thereof moves in a rearwardly direction, the compact stack may be unloaded from the platform 64 onto the ground at the desired storage location, as shown in FIG. 10.

Figure 11:
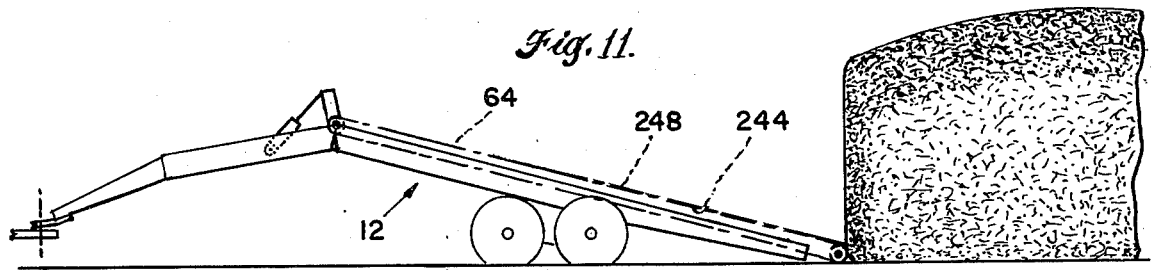
FIG. 11 is a schematic representation of the machine of FIG. 1, showing the machine in its condition for retrieving a previously unloaded stack from the field.

In order to retrieve the unloaded stack, the enclosure 66, the mounting means 68, the channels 74, the obstructing means 40, packing means 42 and the moving means 44 are removed as a unit from the chassis 12 in any suitable manner, and also the delivery means 22 may be removed. Then, with the chassis 12 in substantially the same condition as during unloading, as illustrated in FIG. 11, the stack may be retrieved by the mere simultaneous movement of the machine 10 rearwardly toward the stack and reverse operation of the floor conveyor 244 such that the upper course 248 thereof moves in a forwardly direction.

It is thought that the invention and many of its attendant advantages will be understood from the foregoing description and it will be apparent that various changes may be made in the form, construction and arrangement of the parts of the machine described and that changes may be made in the steps of the method described and their order of accomplishment without departing from the spirit and scope of the invention or sacrificing all of its material advantages, the form hereinbefore described being merely a preferred or exemplary embodiment thereof.

What is clamed is:

1. In a machine for forming a stack of crop material such as hay or the like, the combination comprising:
   a mobile stack forming chamber adapted to move across a field;
   means coupled with said chamber for continuously delivering crop material from the field into said chamber through a first end of said chamber to adjacent an opposite second end of said chamber; and
   a baffle member mounted to said chamber for movement back and forth between said ends of said chamber so as to at least partially obstruct said delivery of crop material to adjacent said opposite second end of said chamber from time to time and distribute said crop material within said chamber between said ends thereof and thereby progressively form a stack of said crop material in said chamber.

2. The combination as recited in claim 1, wherein said baffle member is operable for generally allowing delivery of said crop material to adjacent said opposite second end of said chamber when said member is positioned both adjacent said first end and said opposite end of said chamber and operable for generally at least partially preventing said delivery as said member moves between said ends of said chamber.

3. In a machine for forming a compact stack of crop material such as hay or the like, the combination comprising:
   a mobile chassis adapted to move across a field;
   a stack forming chamber mounted upon said chassis;
   means mounted upon said chassis adjacent said chamber for continuously picking up crop material from the field and propelling said crop material into said chamber through a first end of said chamber toward an opposite second end of said chamber with sufficient velocity to substantially reach said opposite second end of said chamber;
   means mounted in said chamber for movement back and forth between said ends of said chamber so as to at least partially deflect said propelling crop material from time to time and distribute said crop material within said chamber between said ends thereof and thereby progressively form a stack of said crop material in said chamber;
   packing means extending across and mounted to said chamber so as to be movable between said ends of said chamber to compact said distributed crop material as said stack is progressively formed in said chamber; and
   means coupled to said packing means for continuously moving said packing means between said ends of said chamber.

4. The combination as recited in claim 3, wherein said deflecting means is positioned generally above said packing means, coupled to said means for moving said packing means, and is movable between said first end and said opposite second end of said chamber as said packing means is correspondingly moved between said ends of said chamber.

5. The combination as recited in claim 3, wherein said deflecting means comprises:
   carriage means extending across and mounted to said chamber so as to be movable between said first end and said opposite second end of said chamber; and
   a baffle member mounted on said carriage means and movable between first and second positions relative to said carriage means during movement of said carriage means between said first and second ends of said chamber, said baffle member generally allowing said propelling crop material to reach said opposite second end of said chamber both when said baffle member is disposed in its first position and said carriage means is correspondingly positioned adjacent said first end of said chamber and when said baffle member is disposed in its second position and said carriage means is correspondingly positioned adjacent said second end of said chamber, said baffle member generally at least partially preventing said propelling crop material from reaching said opposite second end of said chamber both as said baffle member moves from its first position to its second position during movement of said carriage means from said first end to said second end of said chamber and as said baffle member moves from its second position to its first position during movement of said carriage means from said second end to said first end of said chamber.

6. The combination as recited in claim 5, wherein:
   said carriage means is coupled to said means for moving said packing means, extends generally above said packing means, and is movable between said first end and said opposite second end of said chamber as said packing means is correspondingly moved between said ends of said chamber; and
   said baffle member is mounted to said carriage means generally above said packing means and extends in a spaced relationship generally remotely therefrom when in its said first position such that said propelling crop material may pass between said packing means and said baffle member and in an adjacent relationship thereto when in its second position such that said propelling crop material is prevented from passing therebetween.

7. In a machine for forming a compact stack of crop material such as hay or the like, the combination comprising:
- a mobile chassis adapted to move across a field;
- a crop material receiving platform mounted on said chassis;
- means mounted upon said chassis adjacent said platform for continuously delivering crop material from the field to said platform;
- means for continuously distributing said crop material between opposite ends of said platform so as to progressively form a stack of said crop material on said platform;
- packing means movable between opposite ends of said platform along an upper portion of said stack being formed thereon to compact said distributed crop material as said stack is progressively formed and grows in height on said platform;
- means coupled to said packing means for continuously moving said packing means between said opposite ends of said platform;
- an enclosure for continuously laterally supporting said upper portion of said stack during its formation and compaction as said compact stack progressively grows in height on said platform; and
- said distributing means extending across and being mounted to said enclosure for movement back and forth between said ends of said platform so as to at least partially obstruct said delivery of crop material to said platform and thereby distribute the same between said ends of said platform; and
- mounting means coupled to said chassis for positioning said distributing means and said enclosure above said platform and for vertically displacing said distributing means and said enclosure from said platform as said compact stack grows in height on said platform.

8. The combination as recited in claim 7, wherein:
said enclosure is generally rectangular and has a pair of spaced apart opposing sidewalls and a pair of endwalls respectively extending between corresponding opposite ends of said sidewalls; and
said packing means extends across said enclosure between said sidewalls and is mountably coupled thereto at its opposite ends for movement between said ends of said platform.

9. The combination as recited in claim 8, wherein said enclosure further has a roof structure positioned above said platform with said spaced apart opposing sidewalls depending respectively from opposite lateral sides of said roof structure and one of said endwalls being spaced from said roof structure so as to provide an opening therebetween through which said crop material may be delivered from the field to said platform.

10. The combination as recited in claim 9, wherein:
said delivering means comprises a delivery tube mounted on said chassis, extending generally upright adjacent said opening defined between said one endwall and said roof structure of said enclosure and having an upper opening defined therein which faces toward said enclosure opening, a crop pickup means mounted at a lower end of said delivery tube adjacent the field for picking up crop material from the field and propelling the crop material upwardly through said tube and said upper tube opening, and a deflector movably mounted to said tube adjacent said tube opening for deflecting said propelling crop material emanating from said tube opening into said chamber through said enclosure opening along a desired path; and
means interconnecting said tube opening deflector with said one of said endwalls of said enclosure for moving said deflector as said compact stack being formed in said chamber grows in height and said enclosure is vertically displaced from said platform so as to continue to deflect said propelling crop material emanating from said tube opening into said chamber through said enclosure opening along said desired path.

11. The combination as recited in claim 8, wherein:
one of said endwalls of said enclosure is movable for removing support from about said upper portion at one end of said compact stack at a corresponding one end of said platform when said compact stack has reached its desired height;
means are provided for causing tilting of said platform so as to lower said corresponding one end of said platform adjacent the field; and
said platform has conveyor means operably mounted thereon for unloading said stack from said platform at its one end as said machine is moved away from said stack.

12. The combination as recited in claim 8, wherein:
each of said enclosure sidewalls has formed thereon one of a pair of guide tracks which face toward each other and correspondingly extend between opposing ends of said respective sidewalls; and
said packing means includes a packing roll and a carriage disposed at each opposite end of said roll, said carriages rotatably mounting respective opposite ends of said roll and being respectively coupled to said guide tracks for movement along said tracks between said opposing ends of said respective sidewalls as said packing roll is moved between said opposite end of said platform.

13. The combination as recited in claim 12 wherein:
each of said enclosure sidewalls has formed thereon one of a pair of track surfaces which extend in corresponding relationship to each other and to said guide tracks between said opposing ends of said respective sidewalls; and
said packing roll has a rotatable member fixed at each of its opposite ends adjacent each of said carriages, said rotatable members being respectively supported on said track surfaces and rollable therealong so as to provide positive rotation of said packing roll as said packing roll is moved between said opposite ends of said platform.

14. The combination as recited in claim 13, wherein said moving means comprises:
a telescopeable arm disposed adjacent to, and outwardly of, each of said enclosure sidewalls and being pivotally coupled at one end to said chassis and rotatably coupled at an opposite end to one of said opposite ends of said packing roll adjacent one of said carriages and said rotatable members; and
power means for pivotally swinging each of said telescopeable arms in corresponding fashion such that said respective opposite ends of said arms are moved back and forth between said opposing ends of said respective sidewalls which causes corresponding movement of said carriages along said respective guide tracks, of said packing roll which also rotates and moves between said opposite ends of said platform, and of said rotatable members rolling along said respective track surfaces.

15. The combination as recited in claim 13, wherein said guide tracks and said track surfaces have correspondingly arched profiles whereby said packing roll moves along an arcuate path between said opposite ends of said platform and tends to provide said compact stack with a similarly profiled top.

16. In a machine for forming a compact stack of crop material such as hay or the like, the combination comprising:

a mobile chassis adapted to move across a field;

a stack forming chamber including a crop material receiving platform mounted on said chassis and a generally rectangular enclosure positioned above said platform, said enclosure including a roof structure spaced above said platform, a pair of spaced apart opposing sidewalls depending from said roof structure toward said platform and a pair of endwalls respectively extending between corresponding opposite ends of said sidewalls, one of said endwalls at a first end of said chamber being spaced below said roof structure so as to define an opening therebetween, said enclosure being open at its bottom;

means mounted to said chassis adjacent said first end of said chaamber for continuously picking up crop material from the field and propelling said crop material into said chamber through said opening at said first end of said chamber toward an opposite second end of said chamber with sufficient velocity to substantially reach said opposite second end of said chamber;

means for at least partially deflecting said propelling crop material from time to time to distribute said crop material within said chamber between said ends thereof and thereby progressively form a stack of crop material in said chamber;

packing means extending across said enclosure between said sidewalls and mountably coupled thereto at its opposite ends for movement between said ends of said chamber to compact said distributed crop material as said stack is progressively formed in said chamber, said deflecting means extending across said chamber generally above said packing means, moveably coupled to said roof structure at its upper end and coupled to said opposite ends of said packing means at its lower end, and moveable between said first end and said opposite second end of said chamber as said packing means is correspondingly moved between said ends of said chamber; and means for continuously moving said packing means and said deflecting means between said ends of said chamber.

17. The combination as recited in claim 16, wherein: said roof structure has a guide channel formed therein and extending generally between said ends of said chamber; and said deflecting means includes a carriage frame being coupled at its lower end to said opposite ends of said packing means and at its upper end to said guide channel for movement along said guide channel between said ends of said chamber as said packing means is correspondingly moved between said ends of said chamber and a baffle member moveably mounted to said carriage frame generally above said packing means and extending in a spaced relationship generally remotely therefrom when in a first position such that said propelling crop material may pass between said packing means and said baffle means and in an adjacent relationship thereto when in a second position such that said propelling crop material is substantially prevented from passing therebetween.

18. The combination as recited in claim 17, wherein said baffle member is pivotally mounted on said carriage frame for pivotal movement between said first and second positions during movement of said carriage frame between said first and second ends of said chamber, said baffle member generally allowing said propelling crop material to reach said opposite second end of said chamber both when said baffle member is disposed in its first position and said carriage frame is correspondingly positioned adjacent said first end of said chamber and when said baffle member is disposed in its second position and said carriage frame is correspondingly positioned adjacent said second end of said chamber, said baffle member generally at least partially preventing said propelling crop material from reaching said opposite second end of said chamber both as said second member pivotally moves from its first position to its secnd position during movement of said carriage frame from said first end to said second end of said chamber and as said baffle member pivotally moves from its second position to its first position during movement of said carriage frame from said second end to said first end of said chamber.

19. The combination as recited in claim 1, further comprising:

packing means extending across said chamber and movable between said ends of said chamber to compact said distributed crop material as said stack is progressively formed in said chamber; and means coupled to said packing means for continuously moving said packing means between said ends of said chamber.

20. The combination as recited in claim 1, further comprising:

means movably mounted to said chamber for continuously compacting said distributed crop material in a progressive manner back and forth between said ends of said chamber as said stack is being progressively formed in said chamber.

* * * * *